United States Patent [19]

Bertholon

[11] 4,243,837

[45] Jan. 6, 1981

[54] TELEPHONE TRANSMISSION INSTALLATION BETWEEN INTERLOCUTORS IN A NOISY ENVIRONMENT

[75] Inventor: Philippe P. Bertholon, Boulogne-Billancourt, France

[73] Assignee: Electronique Marcel Dassault, Paris, France

[21] Appl. No.: 933,917

[22] Filed: Aug. 15, 1978

[30] Foreign Application Priority Data

Aug. 18, 1977 [FR] France .................. 77 25338

[51] Int. Cl.³ .............................................. H04M 1/19
[52] U.S. Cl. .................... 179/1 VC; 179/1 P
[58] Field of Search ............ 179/1 VC, 1 VL, 1 SW, 179/1 P, 1 HF, 81 B, 100.1 VC

[56] References Cited

U.S. PATENT DOCUMENTS 3,555,192   1/1971   Hymer ........................... 179/1 VC

FOREIGN PATENT DOCUMENTS 2236320   1/1975   France .
1094357   12/1967   United Kingdom .............. 179/1 VC Primary Examiner—Terrell W. Fears
Assistant Examiner—Joseph A. Popek
Attorney, Agent, or Firm—Haseltine, Lake & Waters

[57] ABSTRACT

An arrangement for controlling a telephone transmission line having an input linked to a sound detection device located in a noisy environment. The transmission line operates only for the transmission of words received by the sound detection device. The transmission line is made operative or inoperative according to whether sound energy variation collected by the sound detection device for duration of a predetermined time interval is superior or inferior to a predetermined approximate audio level.

15 Claims, 1 Drawing Figure

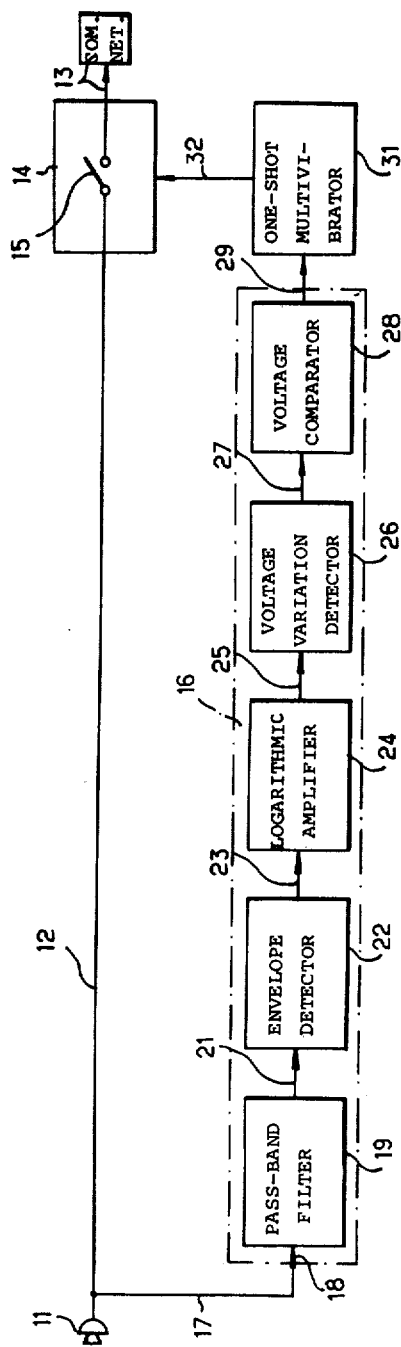

TELEPHONE TRANSMISSION INSTALLATION BETWEEN INTERLOCUTORS IN A NOISY ENVIRONMENT

BACKGROUND OF THE INVENTION

The invention relates to an installation for the telephone transmission of conversations between interlocutors in a noisy environment.

It is a difficult problem to provide a telephonic transmission between interlocutors speaking in a noisy environment. The microphone located in the vicinity of the mouth of one interlocutor receives in fact permanently the environment noise. The earphone or head set with which the other of the interlocutors is provided reproduces the noise collected by the microphone which adds to the noise with which it is himself surrounded.

It is this reason why there has been proposed an installation wherein each of the interlocutors has a switch allowing him at will to isolate his telephone receiver from the microphone or microphones to which the latter is connected. But the manipulation of this switch via a knob or similar calls for manual intervention. In some cases, the intervention is such a constraint that the user prefers to block his switch in the transmission position rather than calling upon one of his hands, particularly when the missions he has to accomplish are delicate and have to be carried out almost instantaneously. But then, the reception by the telephone receiver of the ambient noise collected by the microphone represents a discomfort which, in the long run, may become intolerable.

SUMMARY OF THE INVENTION

The object of the invention is to make operative a telephonic transmission between an interlocutor whose microphone is in a noisy environment and an interlocutor with a telephone receiver, due to the very fact that words are pronounced in front of the microphone. The transmission remains inoperative as long as no word is pronounced in the microphone.

In this connection, the invention calls upon the fact that conversation comprises factors distinguishing it from the ambient noise.

It also makes use of the observation according to which an interlocutor in a noisy environment speaks louder and louder as the noise increases and this with the natural desire to be heard from his interlocutor, so that the pronunciation of a word in front of the microphone, whatever the density of the ambient noise, causes an abrupt increase of the sound energy received by the microphone, sufficient for being distinguished from any ambient noise increase.

In this respect, the invention is characterized in the application of an abrupt sound density increase collected by a microphone in order to make a telephone transmission between the microphone and one or more correspondents operative.

According to the invention also, the human conversation is, for this control, privileged in relation to the ambient noise by applying in the control apparatus foreseen between the microphone and a switch interposed on a telephone transmission line, a band pass filter eliminating the greater part of the outer frequencies in the interval between 300 and 1000 Hz. Such a filter lets pass in fact the first formant of the various vowels, privileging conversation whatever words are pronounced in front of the microphone while eliminating the greater part of the ambient noise effect.

According to one embodiment, the control apparatus comprises further a device making it sensitive only to sound power variations collected by the microphone which occur within a time interval inferior to a predetermined value of the order of 100 ms, thereby leaving the apparatus with its sensitivity as regards the appearance of conversation while avoiding a transmission caused by an ambient noise increase.

In this respect, the invention calls upon the fact that in practice, the ambient noise increase within such a short interval of time is relatively low.

The time constant introduced by the device has moreover the unexpected consequence of protecting the bearer of the telephone receiver against very intense noises of very small duration such as those caused by the shooting of a fire arm, the transmission being non-operative at the moment of maximum intensity of such noises.

BRIEF DESCRIPTION OF THE DRAWING

In the following description which is given as an example, reference is being made to the appended drawing which is a block-diagram representing an installation according to the invention.

DESCRIPTION OF THE PREFERRED EMBODIMENTS

The microphone 11 is placed in front of the mouth of a user in a noisy environment, such a user being for instance the service personnel or gunner of a tank. A line 12 connects the microphone 11 to a telephone communication network 13 connecting it to other crew members or to a transmitter, and on line 12 is interposed an analog switch 14 indicated by the mobile contact 15.

The opening and closing of switch 14 are controlled by an apparatus 16, or human voice detector, mounted in parallel to line 12. From the latter starts a branching 17 leading to the input 18 of a band pass filter 19, the band pass having substantially as lower limit 300 Hz and as upper limit 1000 Hz. This filter is connected via a circuit 21 to an envelope detector 22 comprising advantageously a rectifying device and a low-pass filter the time constant of which may be close to 5 ms.

The envelope detector 22 is connected by a circuit 23 to a logarithmic amplifier 24 which is connected via a circuit 25 to a device 26 allowing taking in account only the voltage variations occuring during a period shorter than substantially 100 ms. This device comprises a band pass filter the integration time constant of which is of the order of 50 ms in the example. The filter, simultaneously with the integration, provides differentiation of the signal with a time constant of the order of 200 ms. The characteristics of the band pass filter 26 can be routinely determined using its integration and differentiation time constants having the aforementioned values of 50 ms and 200 ms, respectively.

The device 26 is connected via a circuit 27 to a fixed threshold voltage comparator 28. Comparator 28 switches over if the voltage applied to it at its input 27 corresponds to a variation superior to a predetermined value. It is connected via a circuit 29 to a monostable device 31 which, brought to its transmission condition, keeps it for a predetermined time of the order of 1.5 second, and thus, through its output 32, keeps closed at least for such a duration the analog switch 14.

The operation is as follows:

As long as the gunner in front of whose mouth is placed the microphone 11 does not talk, the microphone receives only the ambient noise. Experience has proved that within a time interval as short as 100 ms, the ambient noise never varies of a quantity equal or superior to a predetermined value of the order of 6 dB. The comparator 28 has its reference voltage such that for such a variation and for any lower value, the voltage at the comparator 28 input is not capable to cause the supply of a square wave at the output 29 of the comparator.

As soon as the gunner provided with the microphone 11 says a word, and experience has shown that such word is pronounced all the more loudly as the ambient noise is more intense, the energy corresponding to the first formant of the first vowel crosses filter 19 and, after rectification and smoothing by the envelope detector 22, reaches the logarithmic amplifier 24.

Through the logarithmic amplifier 24, one obtains on its output 25 a voltage varying by the same quantity for the same voltage (in dB) of its input signal.

Experience has shown that a variation of 6 dB provided by the microphone 11 is characteristic of a word pronounced, provided the variation takes place within a time interval shorter than 100 ms.

Wheather the ambient noise is low or strong, an increase of 6 dB at the microphone leads to a constant voltage variation at output 25 of the logarithmic amplifier 24.

The duration of a vowel in a normal word being of about 100 ms and the integration time constant of the device 26 of the order of 50 ms, the occurence of conversation provides transmission of part of the first pronounced vowel. The differentiation introduced by the device 26 transmits the level variation of the voltage present at the logarithmic amplifier 24 output. The differentiation is provided with a time constant of the order of 200 ms.

The choice of the reference voltage of comparator 28 provides switching over for the appropriate variation of the input level, advantageously chosen as being of the order of 6 dB. The threshold is fixed, whatever the noise surrounding the microphone 11, and this due to the intervention of the logarithmic amplifier 24.

Comparator 28 delivers then on its output a square wave for each vowel pronounced in front of the microphone.

The intervention of the monostable function device 31 allows switch 14 to provide transfer towards the utilization circuit continuously for a period of time at least equal to the time constant of device 31, of the order of 1.5 second. A word pronounced in front of the microphone 11 is thus integrally transmitted and not cut out, even if it comprises only a few vowels and if it is pronounced slowly.

For this value, also, the switch remains in its closed condition between two successive words, at least for a normal conversation.

Advantageously, the control device assembly is connected inside a casing and the latter is carried by the user instead of the switch at his disposal in the installation where there is provided a manual operation of the telephone transmission control, the rest of the installation being unchanged.

The gunner is then in the best condition for fullfilling his mission and remaining in communication with the other service personnels or the outside world.

What is claimed is:

1. A speech detection device having an input receiving an electrical signal comprising noise and/or speech signals and an output assuming a first state when said electrical signal consists of said noise signal and a second state when said electrical signal comprises said speech signal, said device comprising: a first band-pass filter having an input linked to said input of said device and an output, a rectifier means having an input and an output, a logarithmic amplifier with an input and an output, a second band-pass filter with an input and an output, and a voltage comparator with an input and an output, said rectifier means having its input linked to said output of said first band-pass filter and its output linked to said input of said logarithmic amplifier, said second band-pass filter having its input linked to said output of said logarithmic amplifier and its output linked to said input of said voltage comparator, the output of said voltage comparator being linked to said device output.

2. The device according to claim 1, wherein said rectifier means also comprises a low-pass filter.

3. The device according to claim 2, wherein said low-pass filter has a time constant the value of which is approximately 5 ms.

4. The device according to claim 1, wherein said voltage comparator is a fixed threshold voltage comparator.

5. The device according to claim 1, wherein said first band-pass filter has a frequency passing range extending substantially about 300 Hz and below 1000 Hz.

6. The device according to claim 1, wherein said second band-pass filter has an integration time constant of substantially 50 ms.

7. The device according to claim 1, wherein said second band-pass filter has a differentiation time constant of substantially 200 ms.

8. An apparatus for the automatic switching of a telephone transmission line having an input linked to a sound detection device placed in a noisy environment and an output linked to a network, said transmission line comprising switch means having a closed state for which said telephone transmission line is operative and an open state for which said telephone transmission line is not operative, the state of said switch means being controlled by a speech detection device comprising a first band-pass filter having an input linked to said input of said telephone transmission line and an output, a rectifier means having an input and an output, a logarithmic amplifier with an input and an output, a second band-pass filter with an input and an output, and a voltage comparator with an input and an output, said rectifier means having its input linked to said output of said first band-pass filter and its output linked to said input of said logarithmic amplifier, said second band-pass filter having its input linked to said output of said logarithmic amplifier and its output linked to said input of said voltage comparator, the output of said voltage comparator being used to change the state of said switch means.

9. The apparatus according to claim 8, wherein said rectifier means also comprises a low-pass filter.

10. The apparatus according to claim 9, wherein said low-pass filter has a time constant of substantially 5 ms.

11. The apparatus according to claim 8, wherein said first band-pass filter has a frequency passing range extending above approximately 300 Hz and below approximately 1000 Hz.

12. The apparatus according to claim 8, wherein said second band-pass filter has an integration time constant of substantially 50 ms.

13. The apparatus according to claim 8, wherein said second band-pass filter has a differentiation time constant of substantially 200 ms.

14. An apparatus for the automatic switching of a telephone transmission line having an input linked to a sound detection device placed in a noisy environment and an output linked to a network, said transmission line comprising switch means having a closed state in which said telephone transmission line is operative and an open state in which said telephone transmission line is not operative, the state of said switch means being controlled by a speech detection device comprising a first band-pass filter having an input linked to said input of said telephone transmission line and an output, a rectifier means having an input and an output, a logarithmic amplifier with an input and an output, a second band-pass filter with an input and an output, and a voltage comparator with an input and an output, said rectifier means having its input linked to said output of said first band-pass filter and its output linked to said input of said logarithmic amplifier, said second band-pass filter having its input linked to said output of said logarithmic amplifier and its output linked to said input of said voltage comparator, the output of said voltage comparator being linked to a monostable device.

15. The apparatus according to claim 14, wherein said monostable device, when brought to its unstable condition, keeps it for a predetermined period of time of approximately 1.5 s.

* * * * *